United States Patent Office 3,687,650
Patented Aug. 29, 1972

3,687,650
METHODS OF BONDING FERRITE COMPONENTS
Derek Frank Case, Sunbury-on-Thames, and Kenneth Stammers, Woking, England, assignors to International Computers Limited, London, England
Filed July 30, 1970, Ser. No. 59,600
Claims priority, application Great Britain, Aug. 16, 1969, 41,024/69; Apr. 18, 1970, 18,650/70
Int. Cl. C03b 23/20
U.S. Cl. 65—45                 5 Claims

ABSTRACT OF THE DISCLOSURE

A method for bonding ferrite components in which a glass bonding material is caused to fill the gap between components. The components and glass are heated in a closed environment and the pressure is reduced. After outgassing of bubbles from the gap and ferrite has ceased, the pressure in the environment is increased, while the heat is at least maintained, to cause the glass to flow into and uniformly fill the gap. The glass, upon hardening, then bonds the ferrite components.

BACKGROUND OF THE INVENTION

This invention relates to the bonding of ferrite materials.

In the manufacture of magnetic heads, it is often necessary to bond two or more pieces of core materials together. Ferrite is a common such core material and two pieces of ferrite are normally bonded together by a non-magnetic bonding material. In general, two ferrite pieces are positioned so as to be separated by a gap which is filled with the non-magnetic bonding material.

In known methods of producing a magnetic head core having a non-magnetic gap, two channel shaped components of ferrite material are positioned with their gap defining surfaces opposing one another and the gap is filled with glass, which also serves to bond the ferrite components together, either by positioning a thin foil of glass between the opposing surfaces and softening the glass by heating whilst pressing the ferrite pieces toward one another or by spacing the surfaces apart by spacers and causing molten glass to flow into the gap by capillary action. It is also known to fill the gap and bond the ferrite components together with a synthetic resin.

However, in filling the gap with glass or resin, the glass or resin may not fully wet the surface of the ferrite and air may be occluded in the gap. Due to the extremely small size of the core and the gap therein, any cavities in the gap filling material due to the occluded air may occupy a relatively large volume of the gap thereby weakening the bond between the glass or resin and the ferrite. Furthermore when the ferrite core is machined to the desired shape the cavities in the gap filling material may be exposed and form recesses in the final operational face of the core thereby allowing unwanted material to enter between the opposed surfaces of the ferrite components with a consequent deterioration in performance of the magnetic head.

SUMMARY

According to the present invention, a method of bonding ferrite components includes the steps of positioning first and second ferrite components such that the ferrite components are spaced apart by a predetermined gap; providing a non-magnetic bonding material; subjecting the ferrite components and the bonding material to a pressure substantially less than atmospheric pressure; causing the bonding material to flow in the gap between said ferrite components; and allowing the non-magnetic bonding material to harden and thereby maintain the ferrite components in the desired spaced relationship.

According to another feature of the present invention a method of bonding ferrite components includes the steps of mounting the components to provide a predetermined gap between the two faces of the components which are to be bonded, placing the components and a quantity of bonding material within a closed environment; applying heat to the components and to the bonding material such that the bonding material forms a continuous layer which surrounds and completely encloses the gap; reducing the pressure within the environment to a first pressure level substantially below atmospheric pressure; maintaining the heating and reduced pressure for a period of time at least sufficient to remove substantially all the retained gas from the components and the bonding material; and thereafter, increasing the pressure within the environment to a second level substantially higher than said first level with said second pressure level and the heat applied being such that the gap is uniformly filled with said bonding material.

The non-magnetic material may be a glass composition which is caused to flow by softening or melting the glass by the application of heat. Alternatively, the non-magnetic material may be a synthetic resin which is initially liquid and subsequently hardens by chemical reaction.

BRIEF DESCRIPTION OF THE DRAWING

A method in accordance with the invention will now be described, by way of example, with reference to the accompanying drawing in which.

DESCRIPTION OF THE PREFERRED EMBODIMENTS

Figure 1:
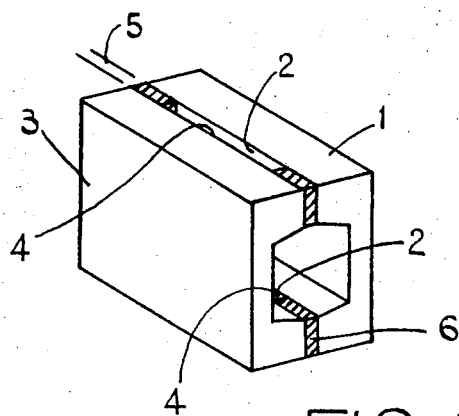
FIG. 1 shows two components of ferrite material prior to bonding.

Referring to FIG. 1, a channel shaped component of ferrite 1 having polished or lapped surfaces 2 is brought into a position relative to a second ferrite component 3 of a similar shape and having polished surfaces 4. The surfaces 2 and 4 are spaced apart at a distance equal to the length of the desired gap 5 by spacers 6 and are maintained in the required relative position by suitable clamps. Glass in the form of a rod or particles is positioned adjacent each of the gaps 5.

Figure 2:
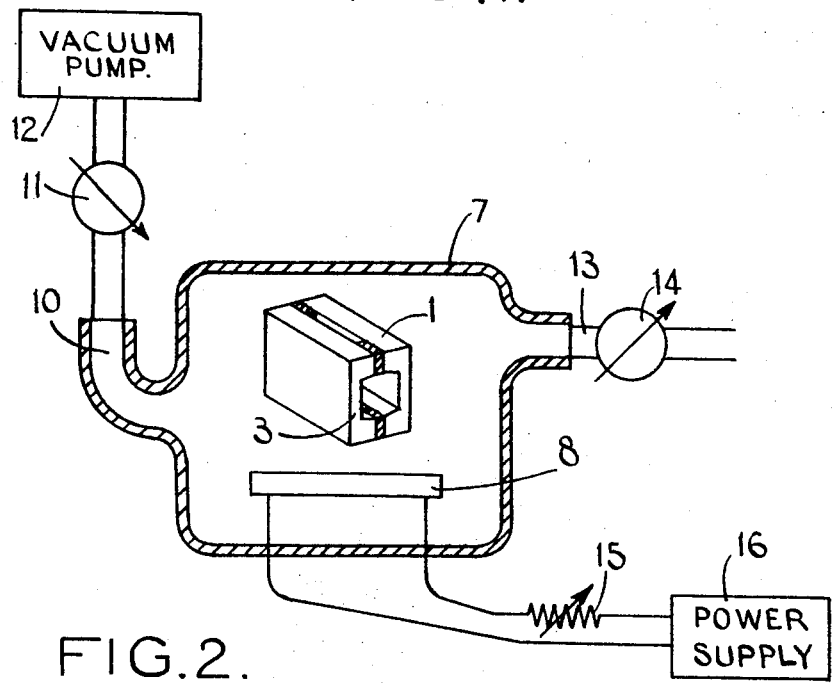
FIG. 2 shows diagrammatically the bonding of components to one another.

Referring now to FIG. 2, the assembly of ferrite components 1 and 3 and the glass bonding material (not shown) are placed in chamber 7. The chamber 7 has an outlet 10 which communicates with valve 11. Valve 11, in turn, communicates with a vacuum pump 12. Chamber 7 also has an outlet 13 which communicates with the atmosphere through valve 14. A heating element 8 is energised by a power supply 16 with a variable resistor 15 being connected between element 8 and the power supply 16. Thus, by varying the resistance of resistor 15, the amount of heat supplied by element 8 to chamber 7 may be controlled.

In bonding ferrite components 1 and 3 to one another the pressure within chamber 7 is reduced to below atmospheric pressure by means of pump 12. At this time, valve 11 remains open while valve 14 is kept closed. The assembly is then heated by a heating element 8 to melt the glass, and due to capillary action, the molten glass flows into the gaps 5. Since the assembly is positioned in an environment having a low pressure, a large proportion of the air contained in the pores of the ferrite material is removed prior to melting the glass and in consequence the likelihood of air being occluded in the interface between the glass and the ferrite is very much reduced.

Instead of placing the glass adjacent the gaps between the ferrite components, the glass may be positioned between the surfaces 2 and 4 during assembly of the ferrite components. The ferrite components are held together, with the glass in the form of a thin sheet interposed between the surfaces 2 and 4, by a spring clip. The sheet is slightly thicker than the length of the gap and when the sheet is sufficiently softened by heating, the surfaces 2 and 4 are enabled to move toward one another under the force applied by the spring clip until stopped by the spacers 6.

If it is desired to fill the gap and bond the ferrite components with synthetic resin, the ferrite components are preferably assembled with spacers and then placed in the chamber 7. After reducing the pressure in the chamber 7 liquid synthetic resin is applied to each gap and allowed to flow into the gaps by capillary action. Heat may be applied to cure the resin.

While the method described above produces a satisfactory bond between ferrite components, it has been found that a stronger and even more effective bond may be produced by adding a step to the method described above. Thus, a preferred form of the present invention will now be described.

Referring again to FIG. 1, two shaped ferrite components 1 and 3 which will form one or more magnetic heads are clamped together in the position in which they are to be bonded together. The opposing faces 2, 4, of the components 1, 3, respectively, which will form the head gap 5 are held apart at a predetermined distance by spacers 6. This distance may be of the order of a few microns and the spacers 6 may be formed by strips of gold, which have been formed on one of the opposing faces 2 and 4 by vacuum deposition.

A suspension of particles of glass in water is painted on the outside faces of the components 1 and 3 round the complete periphery of the gap. The suspension is dried, so that the glass particles adhere to the ferrite, and the components are placed inside a vacuum chamber 7 as shown in FIG. 2.

The heating element 8 is energised to raise the temperature of the ferrite components 1 and 3 at a controlled rate which avoids subjecting the components to thermal shock. The vacuum pump 12 is also brought into operation to lower the pressure within the chamber 7. The combined effect of heat and lowered pressure begin to extract the atmospheric gases held in the pores of the ferrite. At about 340° C., for a particular glass composition (not shown), the particles of glass often sufficiently to coalesce and form a continuous layer round the periphery of the gap 5, thus sealing it off. As the temperature continues to rise to about 450° C. the major outgassing occurs removing both the gas occluded in the ferrite and the gas dissolved in the glass. The gas arising from areas within the gap is expelled through the glass layer and this layer may be seen to be bubbling vigorously when viewed through a low power microscope. The heating and the reduced pressure is maintained at least until all visible signs of outgassing have disappeared. It will be appreciated that once the required operating cycle has been established by observation, further batches of components may be bonded without the necessity for visual inspection. The inspection also establishes that sufficient glass was put on to form a coherent layer on the outside of the components which completely seals off the gap.

At this point, substantially all the retained gases have been removed. The expression "retained gases" is used to mean the occluded and dissolved gases which can be expelled at the particular temperature used for bonding. It may be that further quantities of gas could be expelled at much higher temperatures. However, this does not matter in so far as it will not interfere with proper bonding.

The vacuum pump 12 is now turned off and the pressure within the chamber is allowed to rise in a controlled manner. This may be done by opening valve 14 which allows atmosphere to enter the chamber, or which is connected to a supply of an inert gas, such as nitrogen (not shown). If desired, the pressure in the chamber may be raised to greater than ambient atmospheric pressure.

At the same time as the pressure is increasing, the temperature may be increased to say 550° C. to ensure that the viscosity of the glass is lowered to a point at which it flows easily into the gap 5. Since the gap is sealed off by the continuous layer of glass, the increasing pressure forces the glass into the gap, so that it is filled uniformly. The increased pressure will cause any bubbles formed by traces of gas in the gap to be reduced rapidly in size, and such traces will tend to dissolve in the glass. The heating may be stopped as soon as the glass has completely filled the gap. The chamber 7 is allowed to cool slowly and the bonded components 1 and 3 may then be removed.

As stated above, the glass "uniformly" fills the gap 5. It is to be understood that the term uniformly means that the gap is filled substantially and completely with the space occupied by any retained gas (that may still be present in the gap) being negligible and having no effect on the strength and effectiveness of the bond which is formed.

The bonding material may be applied to the components initially in the form of rods, or strips, which are positioned in line with the edges of the gap, instead of as a particulate suspension. Alternatively, other suitable bonding materials, such as synthetic resins, may be employed instead of glass.

In a modification of the process described immediately above, the bonding material is applied to components 1 and 3 after they have been placed in chamber 7. For example, the bonding material is placed in a crucible within the chamber, at the same time as the components. The temperature is increased and the pressure is decreased in the manner already described. The components are then dipped in the bonding material when the temperature has risen sufficiently to melt the bonding material. The components are dipped in such a way that the bonding material coats the components to form a layer over at least all the periphery of the gap. The components are withdrawn from the bonding material and the process is then continued in the manner described. The formation of layer of bonding material over parts of the components other than the vicinity of the gap may be advantageous in providing protection during subsequent machining operations.

In the processes described above, the relation between the temperature and the increasing pressure is such that the bonding material is forced into the gap solely by the increase of pressure in the chamber. If the temperature is raised to say, 550° C. for the particular glass composition of the example, before the pressure is increased, there will be a substantial flow of bonding material into the gap by capillary action and the increase in pressure then produces a further flow to produce a filling and to eliminate any residual bubbles. Provided that the retained gases have been removed first in the manner described, this alternative in which the gap is filled partly by capillary action and partly by the increase in pressure may be equally satisfactory.

The specific examples have refered to the bonding of ferrite components for the manufacture of magnetic heads. It will be appreciated that the processes described may be used for bonding ferrite components intended for other purposes for which an accurate and uniform bond is necessary.

Also, it will be realised that the bonded ferrite components may be cut into slices, each slice forming a core for a magnetic head. While the production of cores having two ferrite components has been described, more complex cores consisting of a large number of components may be produced in the same manner, for example cores for heads having a read/write section and an erase section.

We claim:

1. A method of bonding ferrite components including the steps of positioning within a closed environment first and second ferrite components such that the ferrite components are spaced apart by a predetermined gap; providing a non-magnetic bonding material; subjecting the ferrite components and the bonding material to the combined effects of heating and a pressure substantially less than atmospheric pressure to remove retained gases from the ferrite components; causing the bonding material to flow in the gap between the ferrite components; and allowing the non-magnetic bonding material to harden and thereby maintain the ferrite components in the desired spaced relationship.

2. A method of bonding ferrite components including the steps of mounting the components to provide a predetermined gap between the two faces of the components which are to be bonded; placing the components and a quantity of bonding material within a closed environment; applying heat to the bonding material such that the bonding material forms a continuous layer which surrounds and completely encloses the gap; reducing the pressure within the environment to a first pressure level substantially below atmospheric pressure; maintaining the heating and reduced pressure for a period of time at least sufficient to remove substantially all the retained gas from the components and the bonding material; and thereafter increasing the pressure within the environment to a second level substantially higher than said first level with said second pressure level and the heat applied being such that the gap is uniformly filled with said bonding material.

3. A method as claimed in claim 2 in which the heat applied is at least maintained while the pressure of said closed environment is increased.

4. A method as claimed in claim 2 in which the heat applied is increased while the presure of said closed environment is increased.

5. A method as claimed in claim 2 in which the step of placing said ferrite components and said bonding material includes applying the bonding material in liquid form to the ferrite components and drying the bonding material to cause the bonding material to adhere to said ferrite components.

References Cited
UNITED STATES PATENTS

| | | | |
|---|---|---|---|
| 3,529,349 | 9/1970 | Van de Schoot et al. | 65—59 X |
| 3,494,026 | 2/1970 | Sugaya | 65—36 X |

ARTHUR D. KELLOGG, Primary Examiner

U.S. Cl. X.R.

65—58, 59, 144, 155; 29—603